United States Patent
Steinert et al.

(10) Patent No.: US 11,939,077 B2
(45) Date of Patent: Mar. 26, 2024

(54) FAN CLUTCH FOR CONVERTIBLE ENGINE

(71) Applicant: Textron Innovations Inc., Providence, RI (US)

(72) Inventors: Alan Hisashi Steinert, Fort Worth, TX (US); Thomas Dewey Parsons, Fort Worth, TX (US); Troy Cyril Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/686,347

(22) Filed: Mar. 3, 2022

(65) Prior Publication Data

US 2022/0194619 A1    Jun. 23, 2022

Related U.S. Application Data

(62) Division of application No. 16/035,340, filed on Jul. 13, 2018, now abandoned.

(51) Int. Cl.

| | |
|---|---|
| *B64D 35/02* | (2006.01) |
| *B64D 27/20* | (2006.01) |
| *F02C 7/36* | (2006.01) |
| *F02K 3/06* | (2006.01) |
| *F02K 3/075* | (2006.01) |
| *F04D 25/16* | (2006.01) |
| *B64C 29/00* | (2006.01) |

(52) U.S. Cl.
CPC ............. *B64D 35/02* (2013.01); *B64D 27/20* (2013.01); *F02C 7/36* (2013.01); *F02K 3/06* (2013.01); *F02K 3/075* (2013.01); *F04D 25/166* (2013.01); *B64C 29/0033* (2013.01); *F05D 2220/323* (2013.01); *F05D 2240/12* (2013.01); *F05D 2260/407* (2013.01); *F05D 2260/408* (2013.01)

(58) Field of Classification Search
CPC ....... B64C 11/325; F01D 5/022; B64D 27/20; B64D 35/02; B64D 29/0033; F02K 3/075
See application file for complete search history.

(56) References Cited

U.S. PATENT DOCUMENTS

| | | | | |
|---|---|---|---|---|
| 2,571,586 | A * | 10/1951 | Lane ..................... | B64D 27/20 244/57 |
| 3,468,473 | A * | 9/1969 | Chilman ................. | F02K 1/66 416/157 R |
| 3,494,539 | A * | 2/1970 | Littleford ............... | F01D 5/022 416/241 A |
| 3,869,221 | A * | 3/1975 | Wildner ................. | F01D 7/00 416/157 R |

(Continued)

*Primary Examiner* — Christopher D Hutchens
(74) *Attorney, Agent, or Firm* — Lightfoot & Alford PLLC

(57) ABSTRACT

Systems and methods include providing an aircraft with a fuselage and a convertible engine disposed within the fuselage. The convertible engine is operable as a turbofan engine in a thrust mode and a turboshaft engine in a shaft power mode. The convertible engine includes a housing, an engine core having a low pressure turbine shaft, and a bypass fan system. The bypass fan system includes a bypass fan having a fan clutch. The fan clutch selectively couples at least a portion of the bypass fan to the low pressure turbine shaft when the convertible engine is operated in the thrust mode and decouples at least a portion of the bypass fan from the low pressure turbine shaft when the convertible engine is operated in the shaft power mode.

19 Claims, 4 Drawing Sheets

(56) References Cited

U.S. PATENT DOCUMENTS

| | | | | |
|---|---|---|---|---|
| 4,758,129 | A * | 7/1988 | Strock | F01D 9/065 416/157 R |
| 5,309,029 | A * | 5/1994 | Gregory | F02C 7/36 290/1 R |
| 5,694,765 | A * | 12/1997 | Hield | F02C 3/113 60/39.163 |
| 8,701,381 | B2 * | 4/2014 | Eames | F01D 7/00 60/39.163 |
| 8,887,485 | B2 * | 11/2014 | Ress, Jr. | F02C 7/36 415/55.2 |
| 8,893,868 | B2 * | 11/2014 | Kennedy | F16D 37/02 192/58.4 |
| 9,605,557 | B1 * | 3/2017 | Rolling | F02K 3/06 |
| 9,835,093 | B2 * | 12/2017 | Golshany | F02C 6/206 |
| 2006/0272917 | A1 * | 12/2006 | Robb | F16D 37/02 192/21.5 |
| 2007/0130913 | A1 * | 6/2007 | Harrison | F02K 3/065 60/226.3 |
| 2014/0377079 | A1 * | 12/2014 | Gieras | B60T 13/748 417/15 |
| 2018/0283468 | A1 * | 10/2018 | Mitrovic | B64D 27/10 |

\* cited by examiner

FAN CLUTCH FOR CONVERTIBLE ENGINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Convertible engines offer the possibility to provide both thrust and mechanical shaft power in new, multi-mode aircraft configurations and in conventional aircraft configurations that require mechanical shaft power in cruise conditions to power generators, charge weapons systems, or the like. These convertible engines are operable as a turbofan engine to produce thrust and a turboshaft engine to produce mechanical shaft power when thrust is not required. Such convertible engines utilize a bypass fan positioned in front of the engine core and rigidly connected to a power output shaft. During operation as a turbofan engine, the bypass fan produces a bypass airflow to provide thrust to the aircraft. During operation as a turboshaft engine, the bypass airflow produced by the bypass fan is blocked, allowing other aircraft systems to utilize the power produced by the convertible engine via the power output shaft. However, the bypass fan always rotates with operation of the convertible engine, even when bypass airflow used to produced thrust is not required. This results in significant parasitic power loss caused by the drag of the rotating bypass fan. Additional power or performance losses may also result from the increased size of filtration system components and increased pressure drop through such filtration components. Further, bypass airflow increases residual thrust levels which must be compensated for by other aircraft systems (e.g., main rotor) which further drives additional power or performance losses.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
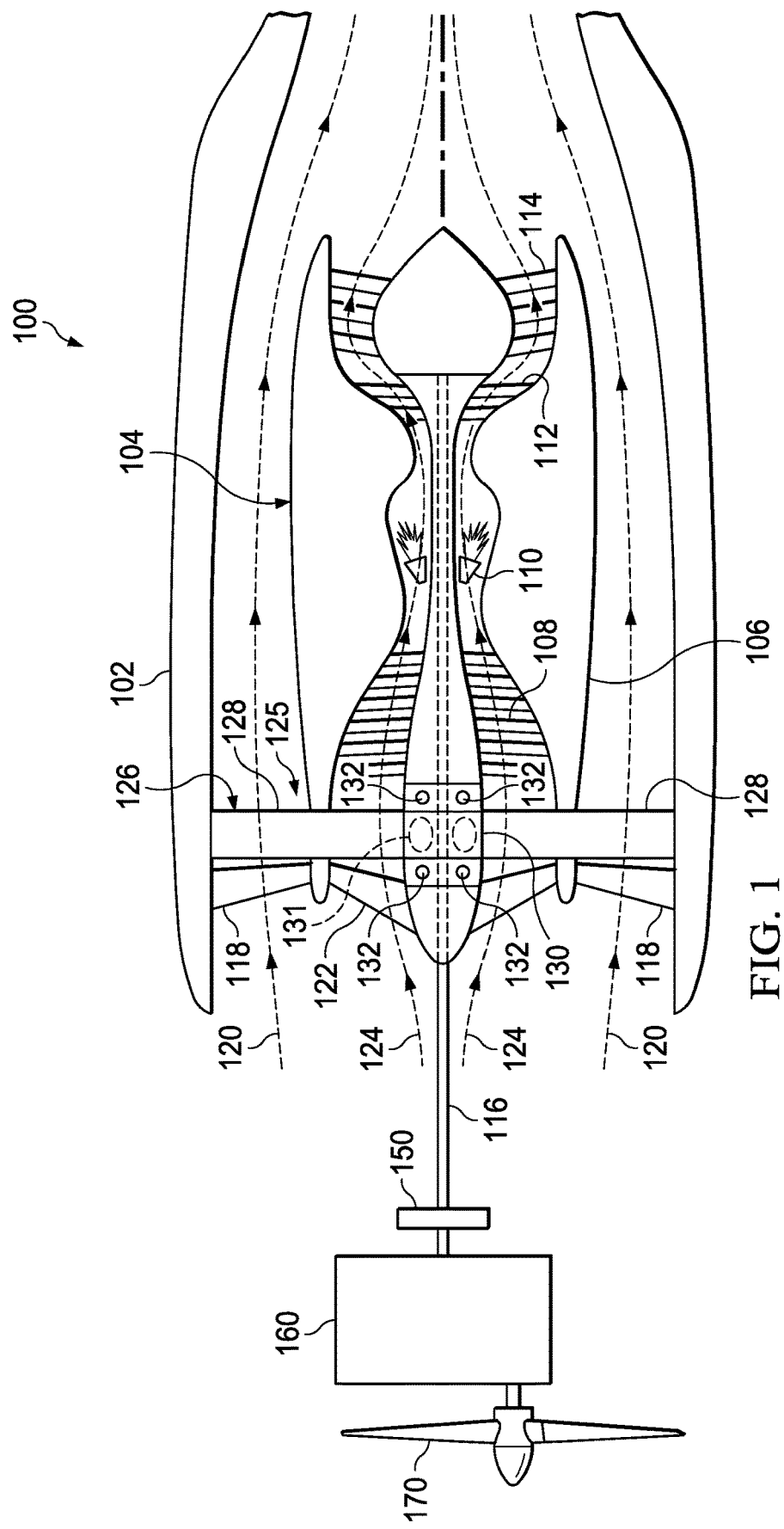
FIG. 1 is a cross-sectional side view of an aircraft engine according to this disclosure.

Referring to FIG. 1, a cross-sectional side view of an aircraft engine 100 is shown. Aircraft engine 100 generally comprises a convertible engine that is operable as a turbofan engine in a thrust mode and a turboshaft engine in a shaft power mode. Aircraft engine 100 comprises a housing 102, an engine core 104, and a bypass fan 126. The engine core 104 comprises an engine core housing 106, a compressor 108, a burner 110, a high pressure turbine 112, a low pressure turbine 114, and a low pressure turbine shaft 116. The low pressure turbine shaft 116 extends beyond a front portion of the housing 102 and is generally connected to another component for transferring power to the component. In the embodiment shown, the low pressure turbine shaft 116 is selectively coupled to and decoupled from a gearbox 160 through a selectively operable gearbox clutch 150 in order to cause selective rotation of a rotor system 170. The aircraft engine 100 also comprises a plurality of inlet guide vanes 118 configured to regulate bypass airflow 120 through the aircraft engine 100. Additionally, the aircraft engine 100 comprises a core stator 122 through which the core airflow 124 passes through prior to entering the compressor 108 of the engine core 104. The inlet guide vanes 118 and core stator 122 are fixed reference components that do not rotate with respect to the housing 102 of the aircraft engine 100.

Aircraft engine 100 further comprises a bypass fan system 125 comprising a bypass fan 126 and a plurality of electromagnets 132. Bypass fan 126 is positioned in front of the engine core 104 and behind the fixed reference components of the inlet guide vanes 118 and core stator 122. Bypass fan 126 is also concentric with the low pressure turbine shaft 116. Bypass fan 126 comprises a plurality of fan blades 128 and a fan clutch 130 and is configured to generate the bypass airflow 120 through the aircraft engine 100 in order to produce thrust. The fan clutch 130 is configured to selectively couple and decouple the bypass fan 126 to and from the low pressure turbine shaft 116. In the embodiment shown, the fan clutch 130 comprises a magnetorheological clutch. As such, the fan clutch 130 carries a magnetorheological fluid 131. Electromagnets 132 are disposed within at least one non-rotating, fixed reference component and in close proximity to the fan clutch 130. Electromagnets 132 are configured to selectively induce a magnetic field through the magnetorheological fluid 131 in the fan clutch 130 to couple and decouple the bypass fan 126 to and from the low pressure turbine shaft 116. In some embodiments, the electromagnets 132 may be located in front of the bypass fan 126 and disposed within the core stator 122. However, in other embodiments, the electromagnets 132 may be located behind the bypass fan 126 and disposed within a portion of the engine core housing 106 that houses the compressor 108. While in the embodiment shown, the bypass fan system 125 comprises a plurality of electromagnets 132, some embodiments of the bypass fan system 125 may only comprise one electromagnet 132 disposed within one of the non-rotating, fixed reference components and in close proximity to the fan clutch 130. Further, in some embodiments, the fan clutch 130 may comprise a friction-type electromechanical clutch or a piezoelectric clutch and may not comprise electromagnets 132.

In operation, the aircraft engine 100 generally comprises a convertible engine that is operable as a turbofan engine in a thrust mode and a turboshaft engine in a shaft power mode.

When thrust is required from the aircraft engine 100, the aircraft engine 100 may be configured to operate as a turbofan engine in the thrust mode. In the thrust mode, the bypass fan 126 is coupled to the rotating low pressure turbine shaft 116 via the fan clutch 130 in order for the bypass fan 126 to rotate with the low pressure turbine shaft 116 and generate bypass airflow 120 that induces thrust. Additionally, the gearbox 160 may be selectively decoupled from the low pressure turbine shaft 116 via the gearbox clutch 150. To couple the bypass fan 126 to the low pressure turbine shaft 116, electrical current is passed through the electromagnets 132, thereby producing a magnetic field proximate to the fan clutch 130. When the fan clutch 130 is subjected to the magnetic field, the magnetorheological fluid 131 in the fan clutch 130 increases its apparent viscosity, to the point of becoming a viscoelastic solid, thereby rigidly coupling the bypass fan 126 to the low pressure turbine shaft 116. When the magnetic field is present and the bypass fan 126 is coupled to the low pressure turbine shaft 116, additional mechanical locking components or mechanisms (e.g., splines) may be used between the bypass fan 226 and the low pressure turbine shaft 116 to further enhance the rigid mechanical connection.

When thrust is not required from the aircraft engine 100, the aircraft engine 100 may be configured to operate as a turboshaft engine in a shaft power mode to provide shaft power to a gearbox 160. In the shaft power mode, the bypass fan 126 is decoupled from the rotating low pressure turbine shaft 116 via the fan clutch 130. Additionally, the gearbox 160 may be selectively coupled to the low pressure turbine shaft 116 via the gearbox clutch 150 to use the shaft power produced by the aircraft engine 100 in the shaft power mode to cause selective rotation of rotor system 170. To decouple the bypass fan 126 from the low pressure turbine shaft 116, the electrical current passing through the electromagnets 132 is discontinued or interrupted, thereby removing the magnetic field. When the magnetic field is removed from the fan clutch 130, the magnetorheological fluid 131 in the fan clutch 130 decreases its apparent viscosity, returning to a viscous liquid, and thereby decoupling the bypass fan 126 from the low pressure turbine shaft 116. When the bypass fan 126 is decoupled from the low pressure turbine shaft 116, the bypass fan 126 is free to spin about the low pressure turbine shaft 116 and does not absorb power, provide drag, or generate bypass airflow 120 to induce thrust. As such, in the shaft power mode, additional shaft power is available for transfer to the gearbox 160 through the low pressure turbine shaft 116.

The amount of bypass fan power that can be converted to mechanical shaft power is referred to as turn down ratio. Traditional rigidly fixed bypass fans have turn down ratios between 50% and 75%, rendering 25% to 50% of the engine power unusable. However, by decoupling bypass fan 126 from the low pressure turbine shaft 116 in the shaft power mode, aircraft engine 100 can achieve much a higher turn down ratio. Further, when the fan clutch 130 is not subjected to the magnetic field, some residual coupling viscosity in the magnetorheological fluid 131 may tend to heat the fluid 131. However, the fan clutch 130 may be designed and positioned such that core airflow 124 through the compressor 108 may cool the fluid 131 in the fan clutch 130 to prevent temperature-induced degradation of the fluid 131. Still further, the inlet guide vanes 118 may be closed to restrict bypass airflow 120 through the aircraft engine 100 to further reduce residual thrust, control turn down ratio, and increase shaft power.

Figure 2:
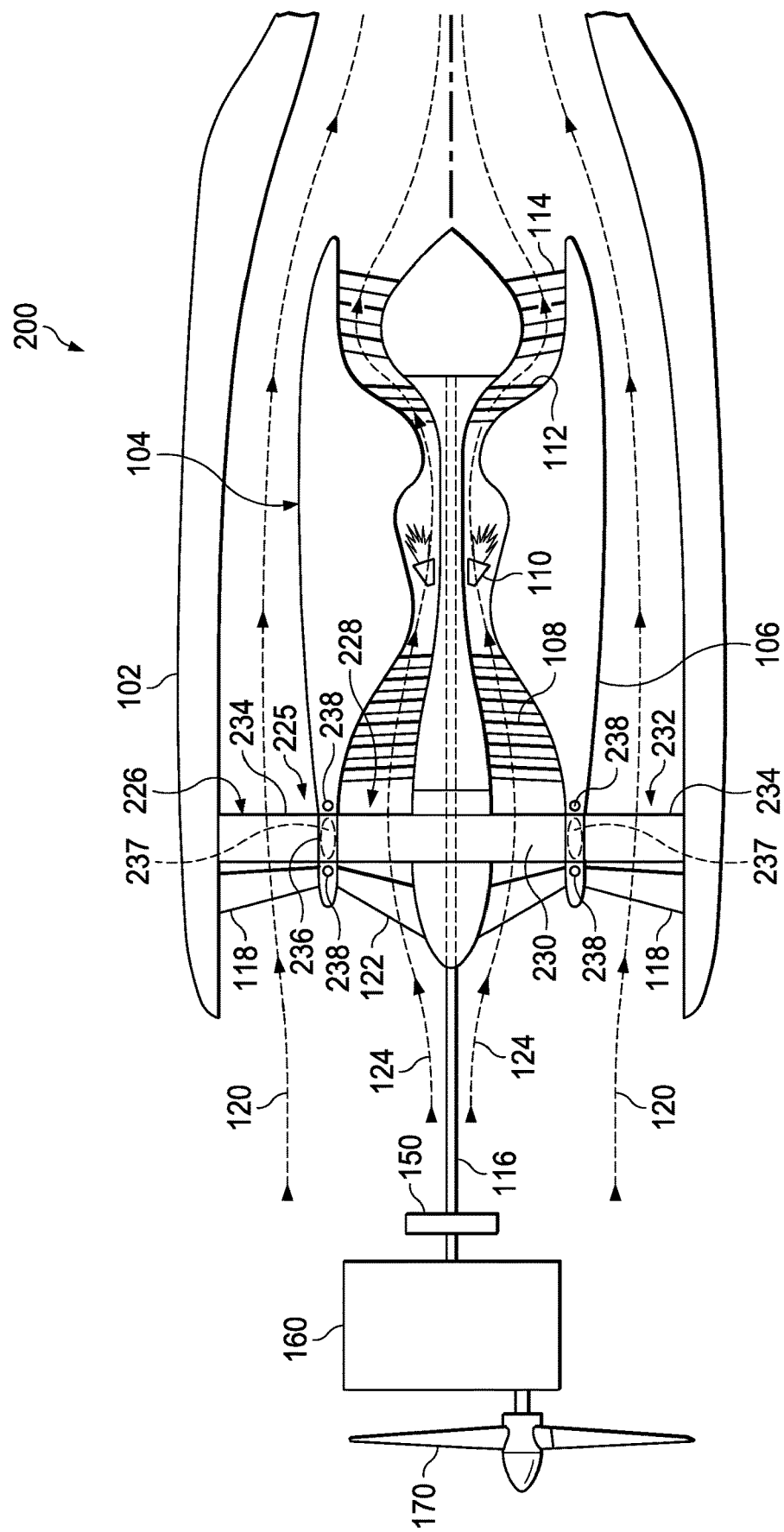
FIG. 2 is a cross-sectional side view of another embodiment of an aircraft engine according to this disclosure.
Figure 3:
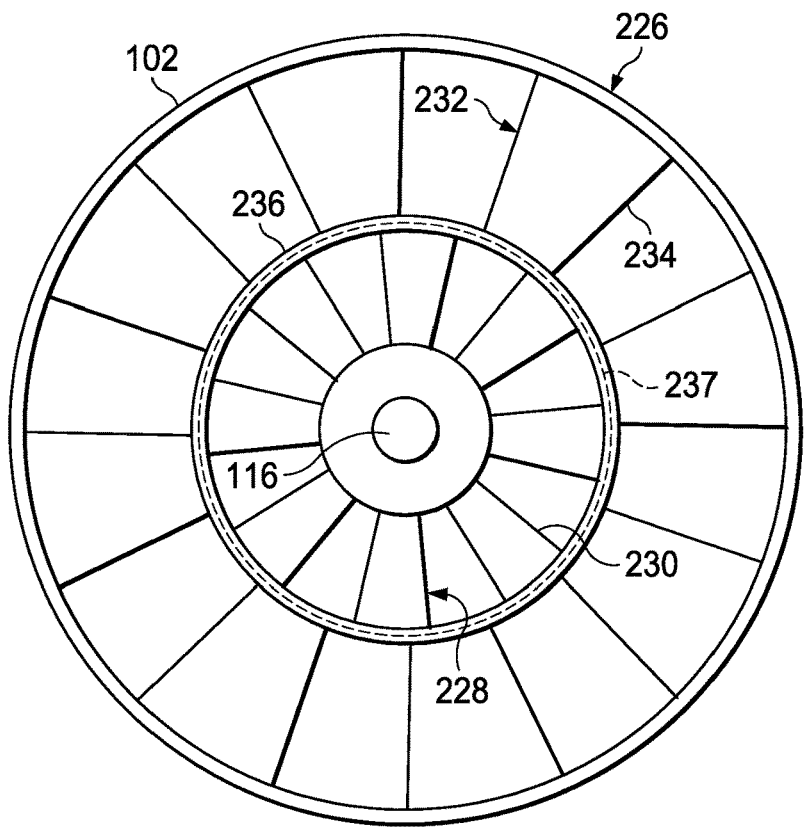
FIG. 3 is a front view of a bypass fan of the aircraft engine of FIG. 2.

Referring to FIGS. 2 and 3, a cross-sectional side view of another embodiment of an aircraft engine 200 and a front view of a bypass fan 226 of the aircraft engine 200 are shown. Aircraft engine 200 is substantially similar to and configured to operate in a substantially similar manner to aircraft engine 100. However, aircraft engine 200 comprises bypass fan system 225. Bypass fan system 225 comprises a bypass fan 226 and a plurality of electromagnets 238. Bypass fan 226 is positioned in front of the engine core 104 and behind the fixed reference components of the inlet guide vanes 118 and core stator 122. Bypass fan 226 is also concentric with the low pressure turbine shaft 116. Bypass fan 226 comprises an inner fan 228 (compression portion) comprising a plurality of fan blades 230, an outer fan 232 (bypass portion) comprising a plurality of fan blades 234 and disposed concentrically about the inner fan 228, and a fan clutch 236 forming a clutch ring disposed between the inner fan 228 and the outer fan 232. While not shown, a bearing or plurality of bearings may be disposed between the inner fan 228 and outer fan 232 to effectuate smooth and/or free rotation of the outer fan 232 with respect to the inner fan 228.

The inner fan 228 is rigidly coupled to the low pressure turbine shaft 116 and rotates with the low pressure turbine shaft 116, while the outer fan 232 may generally rotate freely with respect to the inner fan 228 and the low pressure turbine shaft 116. However, the fan clutch 236 is configured to selectively couple and decouple the outer fan 232 to and from the inner fan 228. In the embodiment shown, the fan clutch 236 comprises a magnetorheological clutch. As such, the fan clutch 236 carries a magnetorheological fluid 237. Electromagnets 238 are disposed within at least one non-rotating, fixed reference component and in close proximity to the fan clutch 236 and configured to selectively induce a magnetic field through the magnetorheological fluid 237 in the fan clutch 236 to couple and decouple the outer fan 232 to and from the inner fan 228 and consequently the low pressure turbine shaft 116. In some embodiments, the electromagnets 238 may be located in front of the bypass fan 226 and disposed within the core stator 122 or an outer ring of the core stator 122. However, in other embodiments, the electromagnets 238 may be located behind the bypass fan 226 and disposed within a portion of the engine core housing 106 that houses the compressor 108. While in the embodiment shown, the bypass fan system 225 comprises a plurality of electromagnets 238, some embodiments of the bypass fan system 225 may only comprise one electromagnet 238 disposed within one of the non-rotating, fixed reference components and in close proximity to the fan clutch 236. Further, in some embodiments, the fan clutch 236 may comprise a friction-type electromechanical clutch or a piezoelectric clutch and may not comprise electromagnets 238.

In operation, the aircraft engine 200 generally comprises a convertible engine that is operable as a turbofan engine in a thrust mode and a turboshaft engine in a shaft power mode. When thrust is required from the aircraft engine 200, the aircraft engine 200 may be configured to operate as a turbofan engine in the thrust mode. In the thrust mode, the outer fan 232 is coupled to the inner fan 228 and consequently the rotating low pressure turbine shaft 116 via the fan clutch 236 in order for the outer fan 232 to rotate with the low pressure turbine shaft 116 and generate bypass airflow 120 that induces thrust. Additionally, the gearbox 160 may be selectively decoupled from the low pressure turbine shaft 116 via the gearbox clutch 150. To couple the outer fan 232 to the inner fan 228 rotating with the low pressure turbine shaft 116, electrical current is passed through the electromagnets 238, thereby producing a magnetic field proximate to the fan clutch 236. When the fan clutch 236 is subjected to the magnetic field, the magnetorheological fluid 237 in the fan clutch 236 increases its apparent viscosity, to the point of becoming a viscoelastic solid, thereby rigidly coupling the outer fan 232 to the inner fan 228 and consequently the low pressure turbine shaft 116. When the magnetic field is present and the outer fan 232 is coupled to the inner fan 228, additional mechanical locking components or mechanisms (e.g., splines) may be used between the inner fan 228 and outer fan 232 to further enhance the rigid mechanical connection.

When thrust is not required from the aircraft engine 200, the aircraft engine 200 may be configured to operate as a turboshaft engine in a shaft power mode to provide shaft power to a gearbox 160. In the shaft power mode, the outer fan 232 is decoupled from the rotating inner fan 228 via the fan clutch 236. Additionally, the gearbox 160 may be selectively coupled to the low pressure turbine shaft 116 via the gearbox clutch 150 to use the shaft power produced by the aircraft engine 200 in the shaft power mode to cause selective rotation of rotor system 170. To decouple the outer fan 232 from the inner fan 228, the electrical current passing through the electromagnets 238 is discontinued or interrupted, thereby removing the magnetic field. When the magnetic field is removed from the fan clutch 236, the magnetorheological fluid 237 in the fan clutch 236 decreases its apparent viscosity, returning to a viscous liquid, and thereby decoupling the outer fan 232 from the inner fan 228 and consequently the low pressure turbine shaft 116. When the outer fan 232 is decoupled from the inner fan 228, the outer fan 232 is free to spin concentrically about the inner fan 228 and the low pressure turbine shaft 116 and does not absorb power, provide drag, or generate bypass airflow 120 to induce thrust. However, the inner fan 228 still rotates with the low pressure turbine shaft 116 in the shaft power mode in order to turbocharge the engine core 104 by increasing and/or pressurizing the core airflow 124, thereby increasing the shaft power output. As such, in the shaft power mode, additional shaft power is available for transfer to the gearbox 160 through the low pressure turbine shaft 116.

The amount of bypass fan power that can be converted to mechanical shaft power is referred to as turn down ratio. Traditional rigidly fixed bypass fans have turn down ratios between 50% and 75%, rendering 25% to 50% of the engine power unusable. However, by decoupling the outer fan 232 of the bypass fan 226 from the inner fan 228 and the low pressure turbine shaft 116 in the shaft power mode, aircraft engine 200 can achieve much a higher turn down ratio that may exceed 95%, thereby rendering only 5% of the power produced by the aircraft engine 200 unusable. Further, when the fan clutch 236 is not subjected to the magnetic field, some residual coupling viscosity in the magnetorheological fluid 237 may tend to heat the fluid 237. However, the fan clutch 236 may be designed and positioned such that core airflow 124 through the compressor 108 may cool the fluid 237 in the fan clutch 236 to prevent temperature-induced degradation of the fluid 237. Still further, the inlet guide vanes 118 may be closed to restrict bypass airflow 120 through the aircraft engine 200 to further reduce residual thrust, control turn down ratio, and increase shaft power.

Figure 4:
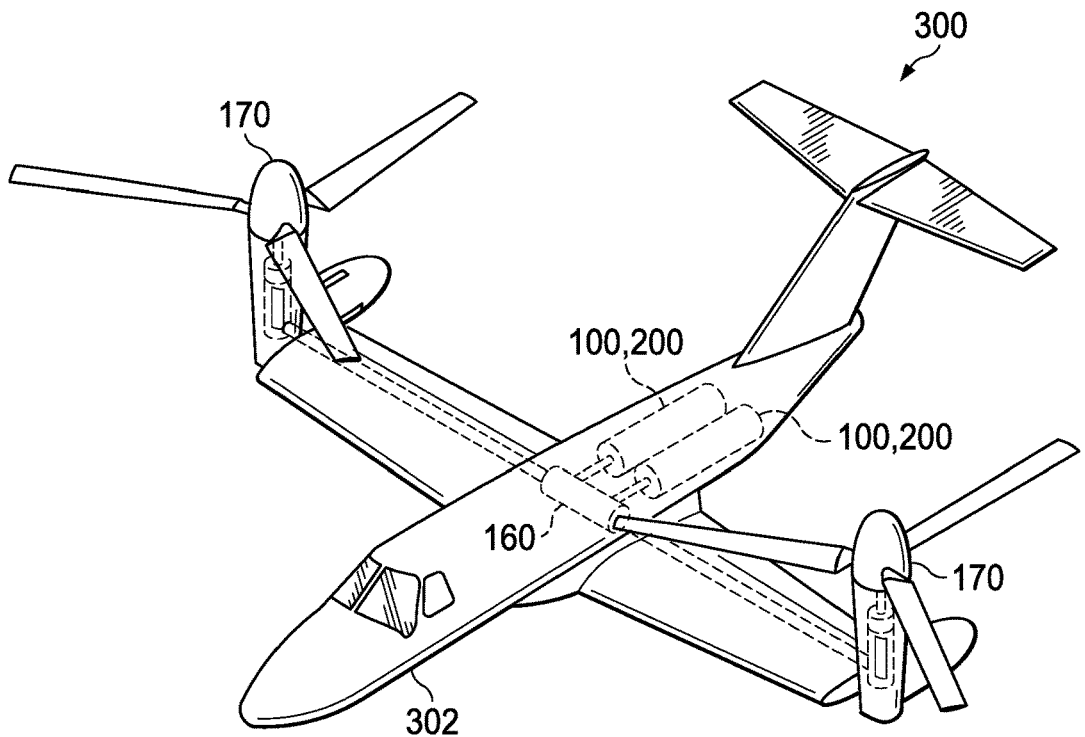
FIG. 4 is a simplified diagram of an aircraft according to this disclosure.

Referring to FIG. 4, a simplified diagram of an aircraft 300 is shown. Aircraft 300 generally comprises a fuselage 302 and at least one aircraft engine 100, 200. However, in some embodiments, aircraft 300 may comprise one or more aircraft engines 100, 200. The at least one aircraft engine 100, 200 may generally be disposed within the fuselage 302 or attached to the fuselage 302. Additionally, aircraft 300 may comprise one or more gearboxes 160 having a gearbox clutch 150 and/or one or more rotor systems 170. Further, multiple aircraft engines 100, 200 may be coupled to a single gearbox 160. In the embodiment shown, aircraft 300 comprises a tiltrotor. However, in other embodiments, aircraft engines 100, 200 may be used in any other aircraft (e.g. fixed-wing aircraft, helicopter, other vertical takeoff and landing (VTOL) aircraft, etc.). This is applicable to both "manned" and "un-manned" aircraft. Furthermore, it will be appreciated that bypass fan systems 125, 225 may be retrofit with existing aircraft engines and/or aircraft.

Figure 5:
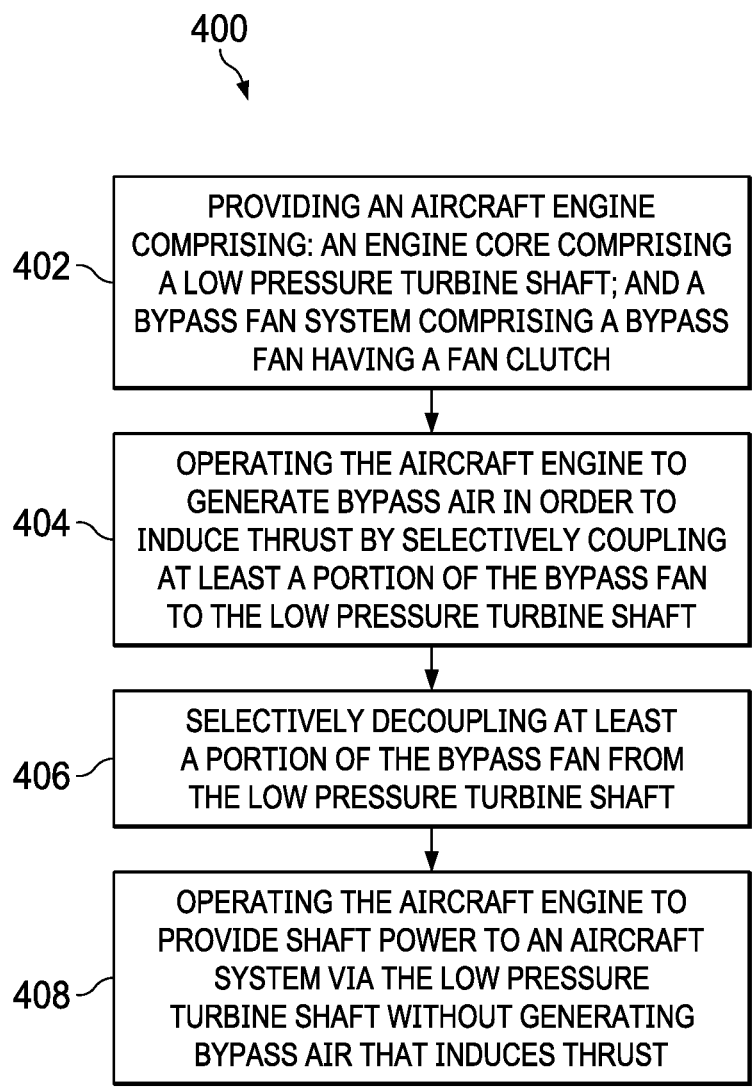
FIG. 5 is a flowchart of a method of operating an aircraft according to this disclosure.

Referring to FIG. 5, a flowchart of a method 400 of operating an aircraft is shown. Method 400 begins at block 402 by providing an aircraft engine 100, 200 comprising: an engine core 104 comprising a low pressure turbine shaft 116; and a bypass fan system 125, 225 comprising a bypass fan 126, 226 having a fan clutch 130, 236. Method 400 continues at block 404 by operating the aircraft engine 100, 200 to generate bypass airflow 120 in order to induce thrust. Thrust may be used to propel an aircraft 300 in forward flight. In some embodiments, bypass airflow 120 may be generated by selectively coupling the bypass fan 126 to the low pressure turbine shaft 116. This may be accomplished by passing an electrical current through electromagnets 132 to produce a magnetic field proximate to the fan clutch 130. In other embodiments, bypass airflow 120 may be generated by selectively coupling an outer fan 232 of the bypass fan 226 to an inner fan 228 of the bypass fan 226. This may be accomplished by passing an electrical current through electromagnets 238 to produce a magnetic field proximate to the fan clutch 236. Method 400 continues at block 406 by selectively disengaging at least a portion of the bypass fan 126, 226 from the low pressure turbine shaft 116. In some embodiments, this may be accomplished by discontinuing or interrupting the electrical current through the electromagnets 132 to decouple the bypass fan 126 from the low pressure turbine shaft 116. In other embodiments, this may be accomplished by discontinuing or interrupting the electrical current through the electromagnets 238 to decouple the outer fan 232 from the inner fan 228 and consequently the low pressure turbine shaft 116. Method 400 may conclude at block 408 by operating the aircraft engine 100, 200 to provide shaft power to an aircraft system via the low pressure turbine shaft 116. In some embodiments, the shaft power from the low pressure turbine shaft 116 may cause selective rotation of a rotor system 170 of an aircraft 300. However, in other embodiments, the aircraft engine 100, 200 may operate as an auxiliary power unit (APU) to provide power to aircraft systems of an aircraft 300.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-$ R$_1$), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A convertible engine for an aircraft, comprising:
   an engine core comprising a low pressure turbine shaft; and
   a bypass fan system comprising:
      an inner fan disposed longitudinally along a length of the low pressure turbine shaft;
      an outer fan disposed at least partially concentrically around the inner fan and at least partially longitudinally overlapping the inner fan along the length of the low pressure turbine shaft; and
      a fan clutch disposed at least partially concentrically around the inner fan and at least partially longitudinally overlapping the inner fan along the length of the low pressure turbine shaft, the outer fan disposed at least partially concentrically around the fan clutch, and the fan clutch being disposed at least partially longitudinally overlapping the outer fan along the length of the low pressure turbine shaft;
      wherein the fan clutch is configured to selectively rotationally decouple the outer fan from the inner fan.

2. The convertible engine of claim 1, wherein the fan clutch is at least one of an electromechanical clutch and a piezoelectric clutch.

3. The convertible engine of claim 1, wherein the fan clutch is a magnetorheological clutch comprising a magnetorheological fluid.

4. The convertible engine of claim 3, wherein electromagnets are disposed in at least one non-rotating, fixed reference component of the convertible engine and in close proximity to the fan clutch, and wherein the electromagnets are configured to selectively induce a magnetic field through the magnetorheological fluid in the fan clutch to couple the at least a portion of the bypass fan to the low pressure turbine shaft.

5. The convertible engine of claim 1, wherein the bypass fan is coupled to the low pressure turbine shaft when the convertible engine is operated in a thrust mode, and wherein the bypass fan is decoupled from the low pressure turbine shaft when the convertible engine is operated in a shaft power mode.

6. The convertible engine of claim 5, further comprising: inlet guide vanes selectively operable to restrict bypass airflow through the convertible engine when the bypass fan is decoupled from the low pressure turbine shaft.

7. The convertible engine of claim 1, wherein the outer fan is free to spin concentrically about the inner fan and does not generate bypass airflow to produce thrust when the outer fan is decoupled from the inner fan.

8. The convertible engine of claim 7, further comprising: inlet guide vanes selectively operable to restrict bypass airflow through the convertible engine when the outer fan is decoupled from the inner fan.

9. The convertible engine of claim 8, wherein the outer fan is coupled to the inner fan via the fan clutch when the convertible engine is operated in a thrust mode, and wherein the outer fan is decoupled from the inner fan when the convertible engine is operated in a shaft power mode.

10. The convertible engine of claim 9, wherein the low pressure turbine shaft is selectively coupled to a gearbox through a selectively operable gearbox clutch to cause selective rotation of a rotor system when the convertible engine is operated in the shaft power mode.

11. An aircraft, comprising:
    a fuselage; and
    a convertible engine disposed within the fuselage and operable as a turbofan engine in a thrust mode and a turboshaft engine in a shaft power mode, the convertible engine comprising:
       an engine core comprising a low pressure turbine shaft; and
       a bypass fan system comprising:
          an inner fan disposed longitudinally along a length of the low pressure turbine shaft;
          an outer fan disposed at least partially concentrically around the inner fan and at least partially longitudinally overlapping the inner fan along the length of the low pressure turbine shaft; and
          a fan clutch disposed at least partially concentrically around the inner fan and at least partially longitudinally overlapping the inner fan along the length of the low pressure turbine shaft, the outer fan disposed at least partially concentrically around the fan clutch, and the fan clutch being disposed at least partially longitudinally overlapping the outer fan along the length of the low pressure turbine shaft;
          wherein the fan clutch is configured to selectively rotationally decouple the outer fan from the inner fan.

12. The aircraft of claim 11, wherein the fan clutch is at least one of an electromechanical clutch, a piezoelectric clutch, and a magnetorheological clutch.

13. The aircraft of claim 11, wherein the low pressure turbine shaft is configured to provide shaft power to at least one aircraft system when the convertible engine is operated in the shaft power mode.

14. The aircraft of claim 13, further comprising: at least one additional mechanical locking component used to form a rigid mechanical connection between the bypass fan and the low pressure turbine shaft when the convertible engine is operated in the thrust mode.

15. The aircraft of claim 13, wherein the low pressure turbine shaft is selectively coupled to a gearbox through a selectively operable gearbox clutch to cause selective rotation of a rotor system when the convertible engine is operated in the shaft power mode.

16. A method of operating an aircraft, comprising:
    providing an aircraft engine comprising: an engine core comprising a low pressure turbine shaft and a bypass fan system comprising an inner fan disposed longitudinally along a length of the low pressure turbine shaft, an outer fan disposed at least partially concentrically around the inner fan and at least partially longitudinally overlapping the inner fan along the length of the low pressure turbine shaft, and a fan clutch disposed at least partially concentrically around the inner fan and at least partially longitudinally overlapping the inner fan along the length of the low pressure turbine shaft, the outer fan disposed at least partially concentrically around the fan clutch, and the fan clutch being disposed at least partially longitudinally overlapping the outer fan along the length of the low pressure turbine shaft;

operating the aircraft engine to generate bypass airflow in order to induce thrust by selectively coupling at least a portion of the bypass fan to the low pressure turbine shaft;

selectively rotationally decoupling the outer fan from the inner fan.

17. The method of claim 16, wherein the selectively decoupling is accomplished by passing an electrical current through a plurality of electromagnets to produce a magnetic field proximate to the fan clutch.

18. The method of claim 17, wherein selectively decoupling at least a portion of the bypass fan from the low pressure turbine shaft is accomplished by interrupting the electrical current through a plurality of electromagnets.

19. The method of claim 16, wherein the low pressure turbine shaft is selectively coupled to a rotor system of the aircraft, and wherein the shaft power from the low pressure turbine shaft is used to cause rotation of the rotor system.

* * * * *